US005361024A

United States Patent [19]

Wisner et al.

[11] Patent Number: 5,361,024

[45] Date of Patent: Nov. 1, 1994

[54] REMOTE, ELECTRICAL STEERING SYSTEM WITH FAULT PROTECTION

[75] Inventors: Gary E. Wisner, Boaz, Ala.; James W. McClellan; Charles W. Harrington, both of Jackson, Tenn.

[73] Assignees: Syncro Corp., Arab, Ala.; Babcock Industries, Inc., Milan, Tenn.

[21] Appl. No.: 65,125

[22] Filed: May 20, 1993

Related U.S. Application Data

[63] Continuation of Ser. No. 602,430, Oct. 22, 1990, Pat. No. 5,214,363.

[51] Int. Cl.[5] .......... G05D 1/00

[52] U.S. Cl. .......... 318/588; 361/23

[58] Field of Search .......... 318/588, 582, 611, 612, 318/628, 280–286, 362, 366, 369, 458, 465, 469; 361/23, 28, 27, 33, 80, 91

[56] References Cited

U.S. PATENT DOCUMENTS 1,694,237 12/1928 Simonds .
1,965,378 7/1934 Hodgman .
2,498,223 2/1950 Rommel .
2,505,555 4/1950 Levy .
2,860,297 11/1958 Bowes .
2,958,024 10/1960 Solis .
3,390,614 7/1968 Tatum .
3,571,684 3/1971 Bech .......... 318/588
3,662,243 5/1972 Cavil et al. .......... 318/588
3,695,205 10/1972 Thomas .......... 318/588 X
3,739,738 6/1973 Cavil .......... 318/588 X
3,798,525 3/1974 Cooper .......... 318/588
4,114,074 9/1978 Stewart et al. .
4,413,215 11/1983 Cavil et al. .......... 318/588
4,419,084 12/1983 Borst .
4,595,867 6/1986 Cognevich et al. .......... 318/588
4,636,701 1/1987 Kodera et al. .......... 318/588 X
4,824,408 4/1989 Aertker et al. .......... 318/164
5,214,363 5/1993 Wisner et al. .......... 318/588

FOREIGN PATENT DOCUMENTS 2080751 2/1982 United Kingdom .

*Primary Examiner*—Jonathan Wysocki
*Attorney, Agent, or Firm*—Harness, Dickey & Pierce

[57] ABSTRACT

A remote, electrical steering system for marine vehicles including an electrical motor operable by a control and power circuit to rotate a drive screw having a screw connection to a nut in a drive tube for moving the drive tube in translation to cause steering movement of a motor-rudder with the control circuit sensing various fault conditions for placing the electrical motor in a brake condition to inhibit inadvertent steering and with the screw and nut connection resisting backlash from the motor-rudder to inhibit inadvertent steering and isolate the electrical motor and associated gearing from backlash loads.

21 Claims, 7 Drawing Sheets

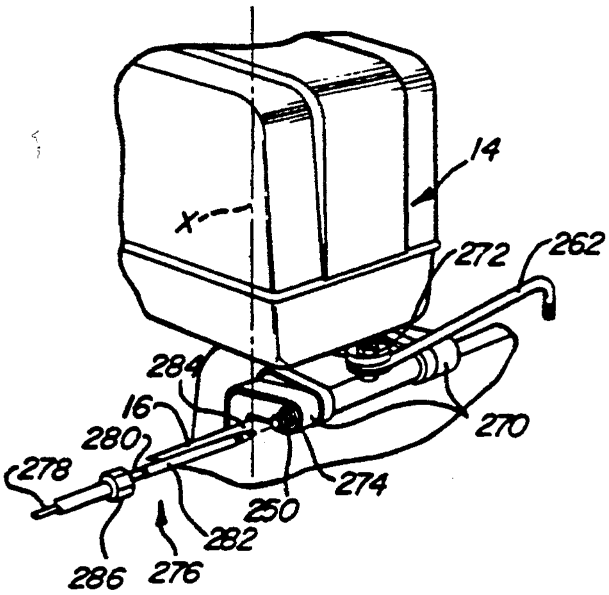
IFig-6A
PRIOR ART
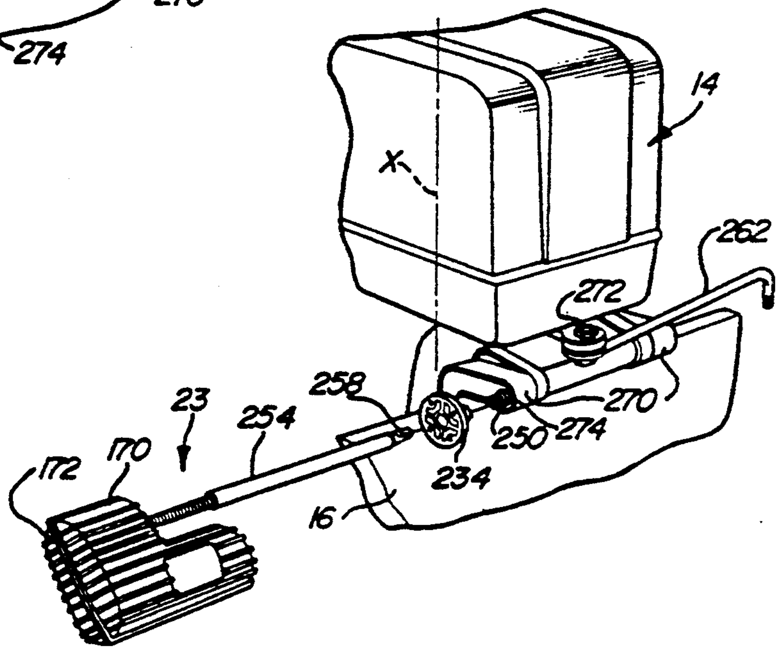
IFig-6B
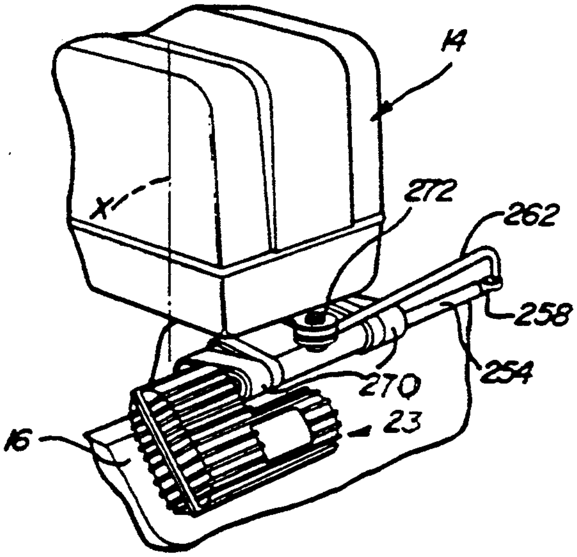
IFig-6C

REMOTE, ELECTRICAL STEERING SYSTEM WITH FAULT PROTECTION

This is a continuation of U.S. patent application Ser. No. 07/602,430, filed Oct. 22, 1990 U.S. Pat. No. 5,214,363.

SUMMARY BACKGROUND OF THE INVENTION

The present invention relates to an electrical control system for providing remote steering for marine vehicles.

Boats, especially of the recreational type, are traditionally equipped with outboard motors, inboard motors and/or inboard-outboard motors. Steering is usually accomplished by pivoting the rudder or by pivoting the motor or the propeller drive of the motor with either of the latter two functioning as a steering rudder. Except for relatively small watercraft with relatively small sized outboard motors, a remote steering mechanism is frequently provided which permits steering movement of the motor, propeller drive unit, etc. to facilitate steering of the boat by the operator at a position remote from the rear (aft) of the boat. While some electrical, remote systems have been employed, traditionally remote steering has been accomplished by a cable or pair of cables which must be run from the steering wheel at or near the front (fore) of the boat to the motor or propeller drive at the back (aft) of the boat. While satisfactory steering can be achieved with cable systems, there are inherent problems with backlash by which the motor or propeller drive unit can oscillate. This oscillation can be severe enough to cause damage to the boat especially with larger motors and at higher speeds. In order to inhibit backlash, a pair of cables are used and are connected in a push-pull manner to opposite sides of the motor or drive unit. This results in a relatively costly assembly requiring balancing between the separate cables. In any event, whether single or dual cable systems are used, different cable lengths and connections are required for different boats of different sizes and different configurations.

In the present invention, remote steering is provided by an electrical system utilizing electronic controls to provide steering via an electric motor. The system is readily adaptable to boats of different sizes and different configurations since common major components can be used from one boat to the next with changes mainly in the length of the wiring harness. For example, the same major components of the remote system of the present invention can be used with outboard, inboard, and/or inboard-outboard motors varying in size and configuration in rating from around 15 horsepower to about 250 horsepower and with boats varying in size and configuration from runabouts to houseboats and cruisers.

In addition the system of the present invention can be provided as original equipment and can also readily be provided as a retrofit for existing boats using a cable system. In this regard, it should be noted that on most boats an industry standard guide tube is connected to the motor or drive unit and is used for the cable steering system. In the present invention, the steering apparatus has been specifically designed to function with the standard guide tube thus making it readily adaptable for use either as an original equipment option or as a retrofit for existing boats.

Thus it is an object of the present invention to provide a unique remote electrical steering system in which a generally common structure can be used for boats having a wide range of sizes and configurations.

It is another object of the present invention to provide a unique remote electrical steering system adapted to provide steering in conjunction with the standard guide tube used in cable steering systems.

It is another object of the present invention to provide a unique remote electrical steering system which is readily adaptable either as original equipment on new boats or as a retrofit for existing boats.

It is a general object of the present invention to provide a unique remote electrical steering system for boats.

Other objects, features, and advantages of the present invention will become apparent from the subsequent description and the appended claims, taken in conjunction with the accompanying drawings, in which:

FIG. 6A is a pictorial view of the motor-rudder of FIG. 1 with a prior art cable steering system shown in a pre-assembled condition relative to the standard guide tube and with some portions shown broken away and others in section;

FIG. 6B is a pictorial view of the motor-rudder of FIG. 1 with the power unit, of the present invention, shown in a preassembled condition relative to the standard guide tube; and FIG. 6C is a pictorial view similar to FIG. 6B showing the power unit of the present invention assembled to the motor-rudder via the standard guide tube.

Figure 1:
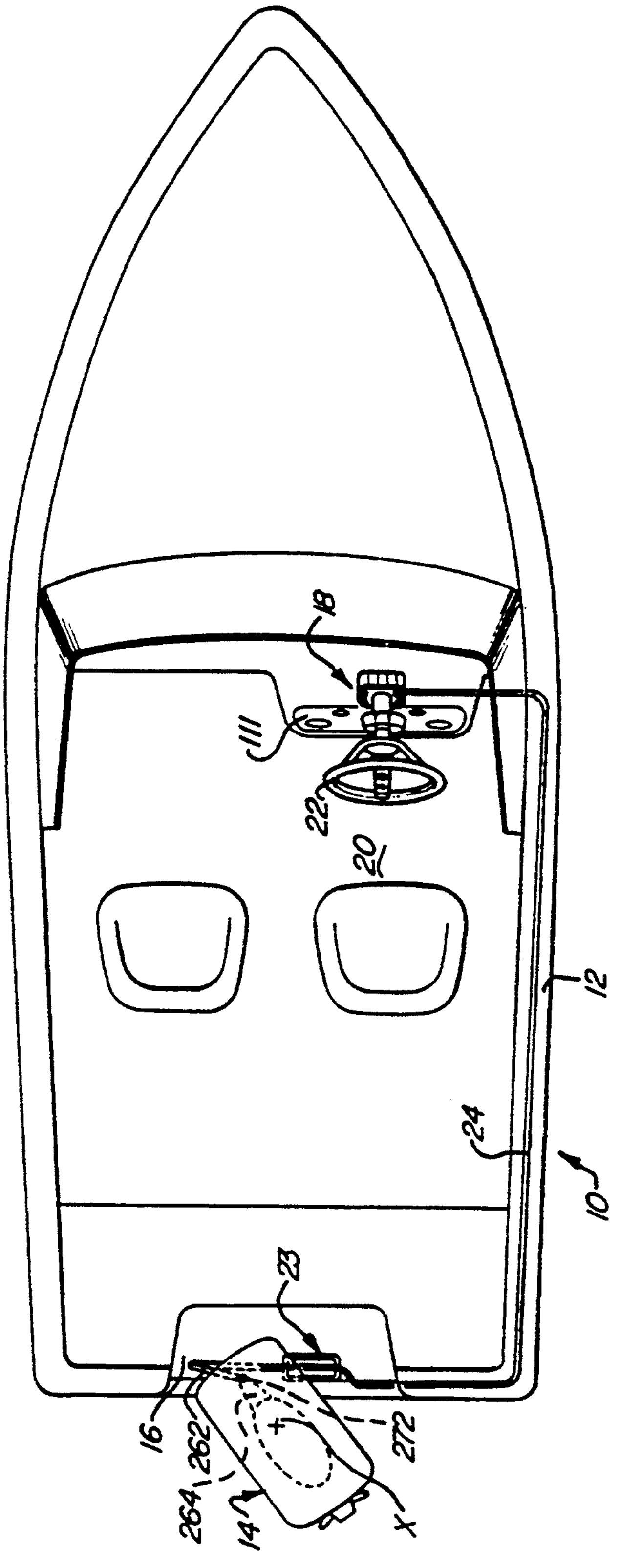
FIG. 1 is a pictorial view of one type of boat with the remote electrical steering system of the present invention generally shown and including a steering unit and a power unit.

Looking now to FIG. 1, a boat 10 is shown to have a body or hull 12 and an outboard motor 14. Typically outboard motors such as motor 14 are secured to a transom structure 16 at the rear (aft) of the boat hull 12. The boat 10 is also shown to have its steering mechanism located at a typical driver location generally towards the front (fore) of the boat hull 12. In the present invention, a steering unit 18 is provided at a driver's compartment 20 and is manipulated by a typical steering wheel 22. The motor 14 is supported at the transom structure 16 for pivotal movement about an axis X which is generally transverse to the body or hull 12 whereby steering of the boat 10 is accomplished. In the present invention, a power unit 23 is secured to the transom structure 16 and is electrically connected to the steering unit 18 via an electrical control cable 24. Thus, as will be seen, the power unit 23 can be actuated in response to actuation of the steering unit 18 to provide the desired pivotal movement of motor 14 about transverse axis X whereby remote steering of the boat 10 can be achieved.

A. The Electrical Control And Power Circuit

Figure 4:
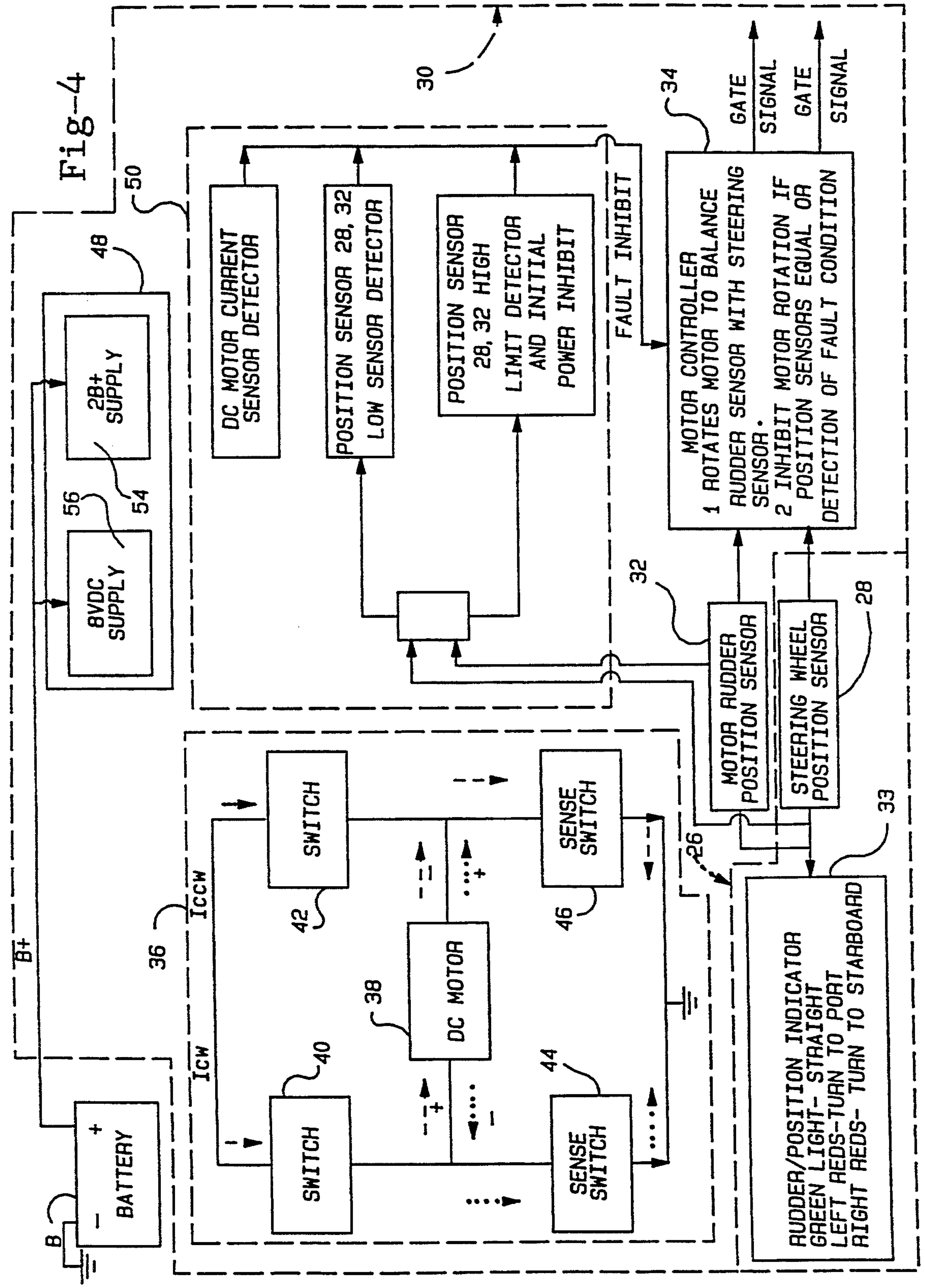
FIG. 4 is a block diagram of the electrical control circuit of the present invention including the circuits of the steering unit and power unit of FIG. 1.

The electrical control and power circuit for the system and hence the electrical interconnection between the steering unit 18 and power unit 23, whereby steering action of the motor 14 is accomplished, can be generally seen from the block diagram of FIG. 4.

In FIG. 4 the electrical circuitry of the steering unit 18 is generally indicated by the numeral 26 and includes a steering wheel position sensor 28. The steering wheel position sensor 28 functions to sense the rotational or angular position of the steering wheel 22 and to provide a signal having a magnitude indicative of that angular, rotational position from a predetermined neutral position. The electrical circuitry of the power unit 23 is generally indicated by the numeral 30 and includes a motor-rudder position sensor 32 which senses the pivotal or angular position of the motor 14 about pivot axis X and provides a signal having a magnitude indicative of that angular, pivotal position relative to a predetermined neutral position. The signal from the motor-rudder position sensor 32 is transmitted to a rudder position indicator circuit 33 of the circuitry 26 of the steering unit 18 and provides a visual display to the driver of the relative port or starboard angle of the motor 14 about pivot axis X relative to the neutral position.

The steering wheel position sensor 28 and motor-rudder position sensor 32 are connected to a motor controller circuit 34 which provides output control signals (GATE SIGNALS) when a predetermined relationship between the signals from the steering wheel position sensor 28 and motor-rudder position sensor 32 is detected. As will be seen this can be in the form of a difference in magnitude between the two sensor signals which difference can be considered as an error signal. This error signal will have a magnitude and a polarity indicative of the magnitude of the difference and direction of the difference, i.e. the signal from steering wheel sensor 28 is greater or less than the signal from the motor-rudder sensor 32. The polarity indication of the error signal in turn will determine the direction of rotation of the motor 14 to comply with the angular position of the steering wheel 22, as selected by the driver, relative to the angular position of the motor 14 about its pivot axis X.

The output control signal (GATE SIGNAL) from the motor controller circuit 34 is transmitted to a motor drive circuit 36 which includes a reversible, direct current (dc) permanent magnet motor 38 controlled by four switch circuits 40, 42, 44 and 46. The dc motor 38 will rotate either clockwise or counterclockwise depending upon the polarity of the error signal and hence upon the polarity of the output control signal from the motor controller circuit 34. The rotation of the dc motor 38 will cause pivotal movement of the motor 14 about axis X to an angular position corresponding to the angular position of the steering wheel 22 whereby steering of the boat 10 is effectuated.

Power for the electrical circuitry of the control system is provided via a battery B which is part of the standard, electrical system of the boat 10 and is typically a positive 12 volts with a negative ground. A power supply circuit 48 is connected to battery B and converts the voltage of battery B to the operating voltages required by the electrical components in the electrical circuit. Thus in the system as shown the battery B provides a B+voltage of 12 volts dc while the power supply circuit 48 provides a regulated 8 volt dc via a voltage converter circuit 56, a 2B+(24 volt dc) supply from a voltage doubler circuit 54 and a filtered voltage Vcc of around 12 volts.

A fault detector circuit 50 is provided to sense a number of predetermined fault conditions in the electrical control system and is operative on motor controller circuit 34 via a fault inhibit line to shut the system down by shorting out or grounding both sides of the rotor windings of the dc motor 38 through switch circuits 44 and 46 whereby rotation of the rotor of the dc motor 38 and hence movement thereby of the outboard motor 14 is inhibited via the permanent magnet field. As will be seen pivotal movement of the outboard motor 14 is further inhibited by the reverse mechanical advantage of the drive screw (210 in FIG. 3) connection between the dc motor 38 and outboard motor 14. The fault detector circuit 50 is designed to sense the following fault conditions:

(1) overload current to the rotor of dc motor 38, (2) low limit sensor detection, i.e. short or partial short in either position sensor 28 or 32, (3) high or open limit sensor detection, i.e. open in either position sensor 28 or 32, and (4) initial power on inhibit, i.e. prevents inadvertent movement of motor 14 by dc motor 38 when system is first turned on.

Figure 5:
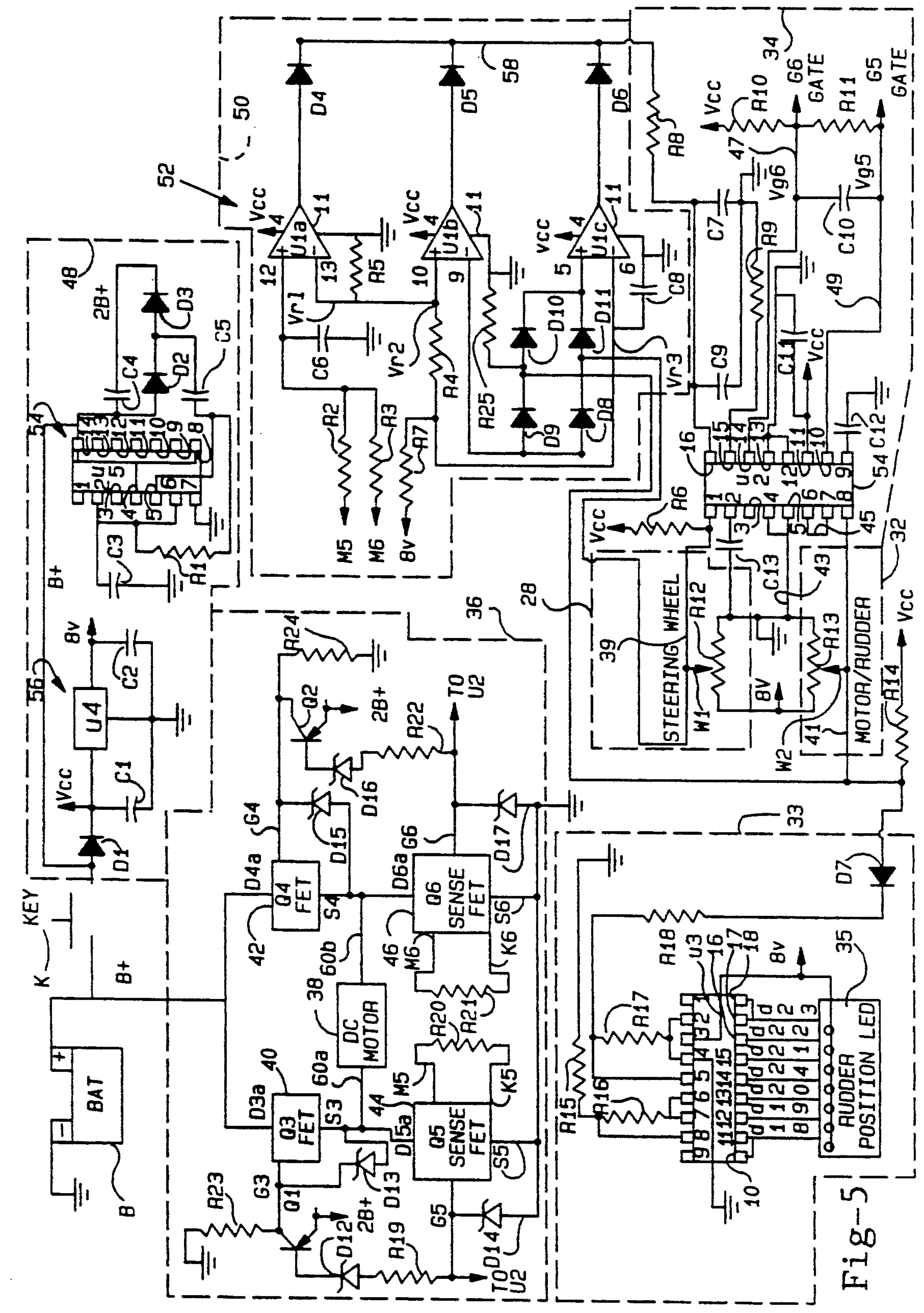
FIG. 5 is an electrical schematic diagram of the electrical control circuit of the steering unit and power unit of the remote electrical control system of the present invention.

The details of the circuits noted in FIG. 4 can be seen from the circuit diagram of FIG. 5.

In one form of the invention as shown in FIG. 5, the components in the circuit were of the following type and value:

| | |
|---|---|
| **Resistors (ohms)** | |
| 1. R1-4, R9, R19, R22-24 | 10k |
| 2. R6, R14, R17-18 | 100k |
| 3. R8, R10, R11, R15-16 | 1k |
| 4. R7 | 680 |
| 5. R5 | 300 |
| 6. R20-21 | 10 |
| 7. R25 | 1 meg |
| **Potentiometers** | |
| 1. R12, R13 | 0-10k |
| **Capacitors (Microfarads)** | |
| 1. C9, C11-13 | .01 |
| 2. C13 | .001 |
| 3. C7 | .47 |
| 4. C2 | .22 |
| 5. C4,5 | 3.3 |
| 6. C8 | 10 |
| 7. C6 | 22 |
| 8. C1 | 100 |
| **Diodes** | |
| 1. D1 | In 4004 |
| 2. D2-11 | In 4148 |
| 3. D18-20, D21-23 | LED (red) |
| D24 | LED (green) |
| **Zener Diodes** | |
| 1. D12-17 | IN 4747 |
| **Integrated Circuits** | |

-continued

| | |
|---|---|
| 1. U1 | LM2902 |
| 2. U2 | MC33030 |
| 3. U3 | LM3914 |
| 4. U4 | MC78L08 |
| 5. U5 | LM556CN |
| Transistors | |
| 1. Q1-2 | 2n6519 |
| 2. FETs Q3-4 | IRFZ40 |
| 3. FETs Q5-6 | MTP40N06M |

Diodes D1–D11 are of a type manufactured by Motorola; LED diodes D18–D24 (Rudder Display LED 28) are of a type manufactured by Panasonic; Integrated Circuits U1, U3 and U5 are of a type manufactured by National; Integrated Circuits U2 and U4 are of a type manufactured by Motorola; Transistors Q1–2 are of a type manufactured by Motorola; and FETs Q3–6 are of a type manufactured by Motorola.

The fault detector circuit 50 includes a solid state quad, operational amplifier integrated circuit 52 with operational amplifiers U1*a*, U1*b*, and U1*c*. The power supply circuit 48 includes the voltage doubler circuit 54 including a solid state device U5 (a timer chip) and the voltage converter circuit 56 including a solid state device U4. The voltage converter circuit 56 includes an input circuit having a diode D1 connected to ground via a filter capacitor C1 and, in the configuration shown, provides a regulated 8 volt direct current output across a capacitor C2 having one side connected to ground. In addition a filtered B+voltage Vcc is provided at capacitor C1. A voltage of 2B+ is supplied from doubler circuit 54 via an oscillating voltage of B+ through diode D3 to B+ through capacitor C4, resulting in a low current supply of 2B+ voltage. Capacitor C3 and resistor R1 at the inputs (terminals 2 and 6) to timer chip U5 determine the B+ oscillating frequency while capacitors C4 and C5 (at U5 terminals 14 and 5, respectively) function as timing circuits with diode D2 to provide the 2B+ output.

The application of power to the dc motor 38 is accomplished by the motor drive circuit 36 which includes the four switch circuits 40, 42, 44 and 46 comprising four field effect transistors (FETs) Q3, Q4, Q5 and Q6, respectively, and the associated gating and output circuitry, connected in a power "H" configuration. The FETs Q5 and Q6 are "sense FETS" and are connected between the dc motor leads 60*a*, 60*b* and ground. FETS Q5 and Q6 are controlled by motor controller circuit 34. The motor control controller circuit 34 includes a motor control integrated circuit U2. Gate signals are provided directly from the motor controller integrated circuit U2 (terminals 10, 14) to gates G5 and G6 of FETS Q5 and Q6, respectively. The battery B is connected to the motor leads 60*a*, 60*b* through input terminals D3, D4 and output terminals S3, S4 of FETs Q3, Q4, respectively. In addition gate voltages to gates G5 and G6 of a magnitude of 2B+ are supplied from the voltage doubler circuit 54. The gate input to gates G4 and G6 of FETS Q4 and Q6 are provided via a gate circuit including a power transistor Q2 having its emitter connected to 2B+ of doubler circuit 54 and its collector connected to gate G4 and to ground via a dropping resistor R24; the base of transistor Q2 is connected to gate G6 of FET Q6 via zener diode D16 and dropping resistor R22. Similarly, the gate input to gates G3 and G5 of FETS Q3 and Q5 are provided via a gate circuit including a power transistor Q1 having its emitter connected to 2B+ of doubler circuit 54 and its collector connected to gate G3 and to ground via a dropping resistor R23; the base of transistor Q1 is connected to gate G5 of FET Q5 via zener diode D12 and dropping resistor R19. Each of the FETs Q3, Q4, QS, and Q6 is protected from excessive gate voltage by zener diodes D13, D14, D15, and D17, respectively, connected from gates G3, G4, G5 and G6 to output terminals $3, $4, $5 and $6, respectively.

Thus each of the common pairs of FETs Q3 and Q5 and FETs Q4 and Q6 are each controlled by a single gate signal with an inverted signal to the FETs Q3–Q4 connected to B+. Thus gate signal Vg5 from U2 is connected to the gate G5 of FET Q5 and to the transistor Q1 to provide the inverted signal to the gate G3 of FET Q3 and gate signal Vg6 from U2 is connected to the gate G6 of FET Q6 and to the transistor Q2 to provide the inverted signal to the gate G4 of FET Q4. This ensures that the different pairs are not closed at the same time which would result in a low resistance path from B+to ground, If the gate voltage Vg6 is applied to FET Q6, the FET Q6 switch is closed. However, the high bias voltage at R22 through zener D16, turns transistor Q2 off. This allows R24 to maintain a low voltage at the gate G4 of FET Q4, thus assuring that the FET Q4 switch will be open. The other condition is a low bias voltage to the gate G6 of FET Q6, resulting in an open condition. The low voltage through R22 and D16 to the base of transistor Q2 turns Q2 on. This applies a voltage of 2B+ to the gate of FET Q4 and closes the FET Q4 switch. The 2B+ level is required to maintain a minimum of 10 volts from gate to source because the gate voltage is 2B+ minus the drop across the rotor of dc motor 38 and the series sense FET Q5 or Q6 to ground.

The motor controller circuit 34 receives a steering input signal to integrated circuit U2 (terminal 1) from the wiper W1 of steering potentiometer R12 via line 39. The same input terminal also receives a fixed input voltage from voltage Vcc via a pull up resistor R6. A motor-rudder input to U2 (terminal 8) is received from the wiper W2 of motor-rudder potentiometer R13 via line 41. The same input terminal also receives a fixed input voltage from voltage Vcc via dropping resistor R14. At the same time terminal 2 of U2 is connected to ground via a filter capacitor C13 while terminals 4 and 5 are connected to ground via line 43 and terminals 6 and 7 are connected together via jumper line 45. Note that the 8 volt supply is connected to one end of the sensor potentiometers R12 and R13 and the other end of the potentiometers is connected to ground. Thus the voltage at the wipers W1 and W2 will vary from 0.–8 volts plus the percentage of Vcc voltage on the low voltage side of resistors R6 and R14, respectively. If either of the wipers W1 or W2 becomes open circuited, the voltage at terminal 1 or 8 will go to voltage Vcc. Integrated circuit U2 also receives an inhibit signal (terminal 16) from fault detector circuit 50 via fault line 58 and via a timing circuit defined by resistor R8 and capacitors C7 and C9 connected in parallel and to ground. Terminal 15 of U2 is connected to ground via dropping resistor R9 while U2 terminal is connected to ground via filter capacitor C12. Operating voltage Vcc is connected to terminal 11 of U2 which is also connected to ground via a filter capacitor C11. U2 terminals 12 and 13 are connected to ground. Output signals are generated at U2 terminals 14 and 10 via lines 47 and 49 with a timing circuit comprising capacitor C10 and resistor R11 connected in parallel across lines 47 and 49. A pull up resistance for voltage Vcc is connected to output lines 47 and 49 via resistor R10 which is connected to line 47.

The function of the motor controller circuit 34 is to compare the signal voltage from the steering wheel position sensor 28 via steering potentiometer R12 to the voltage of the motor-rudder position sensor 32 via rudder potentiometer R13. If the two signals are equal, a gate voltage (VgS, Vg6) is applied from each of the output terminals (10,14) of integrated circuit U2 to gates G5 and G6 of FETS Q5 and Q6 of switch circuits 44 and 46, respectively. This results in FETS Q5 and Q6 turning on and FETS Q3 and Q4 being turned off. This connects the leads *60a*, *60b* to both sides of the rotor of dc motor 38 to ground and causes a dynamic braking action on the permanent magnet, dc motor 38. If the two output, gate signals (Vg5, Vg6) from integrated circuit U2 of motor control circuit 34 are different, a zero voltage is applied to one of the gates of FETs Q5 or Q6 such that one of the FETs Q3 or Q4 is gated whereby the rotor of the dc motor 38 is energized to cause rotor rotation and hence pivotal movement of the outboard motor 14 about its pivot axis X in the direction to decrease the difference in sensor voltages. This correction continues until the difference in sensor voltages or the error signal is zero and the output control signal from the integrated circuit U2 is zero resulting in dc motor 38 being deactuated and the outboard motor 14 being located in the angular steering position desired by the driver.

Another control condition is provided by the fault detection circuit 50 and occurs when one of the previously noted fault conditions is sensed; the fault detection circuit 50 provides an inhibit signal which is transmitted via inhibit line 58 to motor control circuit 34 via dropping resistor R8 to integrated circuit U2 (terminal 16). If this input reaches a preselected level, i.e. 7.5 volts in the circuit shown, the voltage to each of the output terminals (14 and 10) of integrated circuit U2 is removed. This would result in all of the FETs Q3, Q4, Q5 and Q6 being placed in an open condition and the dc motor 38 floating. To prevent unwanted rotation of the rotor of dc motor 38, a pull up resistor R10 has been provided to force a voltage to both output terminals 14 and 10 of integrated circuit U2 and to generate gate voltages Vg5 and Vg6, thus providing for a closed, short circuit condition of FETs Q5 and Q6 and an open circuit condition of Fets Q3 and Q4 resulting in dynamic braking being applied to the rotor of the dc motor 14 in the manner noted before.

As a convenience to the operator, the output from the potentiometer R13 of the motor-rudder sensor 32 is connected to an LED display driver U3 in the position indicator circuit 33. The position indicator circuit 33 is designed to turn on a green light emitting diode (LED) D24 if the motor 14 is in the center or neutral position relative to axis X, i.e. boat 10 being steered straight. As the motor 14 is pivoted about the axis X in a turning manoeuver a series of red LEDs D18–D20 and D21–D23 in an assembly 35 are turned on to visually indicate the direction (port or starboard) and angular range of the motor 14 beyond its center or neutral position relative to axis X.

As noted the fault detector circuit 50 performs the following: (1) detects an excess current condition to the rotor of dc motor 38, (2) detects loss of sensor signals from position sensors 28 and/or 32, and (3) provides a "key on" signal inhibiting movement of the dc motor 38 when the actuating key K is turned on energizing the electrical control circuit. The fault detector circuit 50 includes the operational amplifiers U1*a*–U1*c* of quad amplifier 52 which are used as level detectors with respective output diodes D4, D5 and D6 coupled to the inhibit line 58. The signals being monitored are the sense voltages of the FETs Q5 and Q6 and the sensor outputs at steering and motor-rudder potentiometers R12 and R13. The sense voltages of sense FETS Q5 and Q6 provide an indication of the magnitude of current through the rotor of dc motor 38 and hence an indication of an overload condition. The sensed outputs at steering and motor rudder potentiometers R12 and R13 provide an indication of an open or shorted condition and hence a fault condition at one of the sensor potentiometers R12 and R13.

The voltages at the mirror gates M5, M6 of the sense FETs Q5 and Q6 are proportional to the magnitude of current through the inputs D5*a*, D6*a* and outputs S5 and S6. Resistors R20, R21 are connected from mirror gates MS, M6 to kelvin gates K5, K6 on each sense FET QS, Q6. Input resistors R2, R3 connect the mirror gates MS, M6 (Q5 and Q6) to the positive input of operational amplifier U1*a* (terminal 12) via a time delay circuit including capacitor C6 which has one side connected to ground. The negative input of U1*a* (terminal 13) is connected to the 8 volt supply via dropping resistor R7 and resistor R4 which define a voltage divider circuit with resistor R5 whereby a reference voltage Vr1 is provided at the negative input (terminal 13) of amplifier U1*a*. The reference voltage Vr1 is selected to be equal to one-half of the voltage produced at the mirror gates M5, M6 when the dc motor current through the FETs QS, Q6 is equal to the maximum level. This level is an adjusted value to reflect the design current capacity of the system. As an example, if the maximum design current in the system is 30 amps, the voltage at the mirror gate M5 (FET QS) is 0.45 volts dc. With FET Q6 in the open condition, the voltage at the positive input 0.225 volts dc. Operational amplifier U1*a* is connected to filtered voltage Vcc via terminal 4 with terminal 11 connected to ground. Thus the end result is an output voltage Vcc from the operational amplifier U1*a* through diode D4 if the current level is above the limit which is 30 amps for the circuit shown. This same result would occur if the sensed current was through FET Q6. In normal operation only one of the sense FETs QS, Q6 would be conducting current. The capacitor C6 at the positive input of amplifier U1*a* delays the level detector function to allow the normal start-up current to the dc motor 38. In the event that both the FETs QS, Q6 are conducting, the voltage to the positive input of the operational amplifier Ula is the average of the voltage at mirror gates M5, M6 of each of the FETs Q5, Q6.

The other two operational amplifiers U1*b*, U1*c* are used as level detectors to monitor the sensor feedback from the steering wheel potentiometer R12 and the motor-rudder potentiometer R13. Note that operational amplifiers U1*a*, U1*b* and U1*c* are in a common chip and hence amplifiers U1*b* and U1*c* share common connections to Vcc and ground via terminals 4 and 11. One operational amplifier U1*b* has at its positive input (terminal 10) a voltage reference level Vr2 (which is derived in the same manner and equal to Vr1) set to be equal to the low end of the range of the sensor voltages from R12, R13 . The negative input of U1*b* (terminal 9)

is coupled through two diodes D8, D9 via lines 39 and 41, respectively, to the position sensor potentiometers R12, R13. If either of the leads to sensor potentiometers R12, R13 is shorted to ground, the output of the operational amplifier U1*b* goes to voltage Vcc which is transmitted through diode D5 and resistor R8 via the inhibit input line 58 to motor control integrated circuit U2 (terminal 16). The other operational amplifier U1*c* uses a voltage reference level (Vr3) at its negative input (terminal 6) which is selected to be equal to the high end of the voltage range of the sensor voltage from potentiometers R12, R13. The positive input (terminal 5) is coupled through two diodes D10, D11 via lines 41 and 39, respectively, to the sensor potentiometers R12, R13. A dropping resistor R25 is connected from the juncture of diodes D9 and D10 to ground. Each of the leads from sensor potentiometers R12 and R13 has a pull-up resistor R6, R14. If either of the sensor leads to R12, R13 are opened or shorted to 8 volts dc, the output of the operational amplifier U1*c* goes to voltage Vcc which is transmitted through diode D6, resistor R8, and inhibit line 58 to U2 (terminal 16).

A capacitor C8 is connected to the negative input of U1*c* to delay the reference level when the key K is switched on. The result is an output voltage to the inhibit line 58 each time the unit is powered up. This prevents the rotor of dc motor 38 from turning at initial power up in an attempt to positionally balance the motor 14 relative to the existing position of the steering wheel 22.

In all of the noted inhibit conditions, the operator must move the steering wheel 22 to place the steering sensor potentiometer R12 into balance with the rudder sensor potentiometer R13 before the inhibit condition is removed and the system reset.

Thus as noted, the control circuitry allows the power H switch of motor drive circuit 36 to operate in three states:

1) stop/brake—FETs Q5 and Q6 gated "on" (closed circuit) and FETs Q3 and Q4 "off" (open circuit) as a result of gate signals Vg5 and Vg6 being at voltage Vcc. This results in the motor, rotor leads 60*a* and 60*b* being shorted to ground causing a braking action on the dc motor 38. This helps to hold the outboard motor 14 at the present position and to stop and to resist its rotation about axis X before the dc motor 38 changes rotational direction;

2) Clockwise rotation—FETs Q3 and Q6 gated "on" and, FETs Q4 and Q5 "off" as a result of gate signal Vg5 being low (zero volts) and gate signal Vg6 being high (11 volts). This results in current flow from the battery B through FET Q3 (input D3*a* to output S3) to the dc motor 38 through FET Q6 to ground; and 3) Counter Clockwise rotation—FETs Q4 and Q5 "on" and FETs Q3 and Q6 "off" as a result of gate signal vg5 being high (11 volts) and gate signal Vg6 being low (zero volts). This results in current flow from the battery B through FET Q4 (input D4*a* to output S4) to the dc motor 38 through FET Q5 to ground.

The rudder position indicator 33 includes integrated circuit U3 and LED assembly 35. U3 receives an input voltage at terminal 5 through diode D7 and a voltage divider network including R18 and R17 to ground (through terminals 2 and 4 of U3). The input voltage is the motor-rudder sensed voltage at wiper W2 of potentiometer R13. U3 terminals 2 and 4 are connected directly to ground while terminal 8 is connected to ground via resistor R15 and terminals 6 and 7 are connected to ground via resistor R16 and resistor R15. The regulated 8 volt supply is connected to U3 terminal 3 and to the input of position LED assembly 35.

Thus the integrated circuit U3 will receive signals indicative of the magnitude and angular, positional location of the motor 14 via the combined voltage reference from voltage Vcc and varying voltage from wiper W2 of potentiometer R13. This results in a series of output signals from terminals 10 to 18 of U3 which are transmitted to internal LED diodes D18–D23 in rudder position LED 35 whereby the appropriate one of the diodes D18–D23 will be energized to provide a visual indication to the operator of the angular position of the motor 14 as previously noted, i.e. green LED, straight or neutral, red LED, port or starboard. Note that output terminals 10 and 11 and output terminals 17 and 18 of U3 are connected together to assure a visual signal from rudder position LED28 over the entire range of signals from Motor/Rudder circuit 32 and hence over the entire range of movement of steering wheel 22.

With this description of the electrical control and power circuit, let us next look to the construction of the steering unit 18 and power unit 23.

B. The Steering Unit 18

Figures 2, 5A:
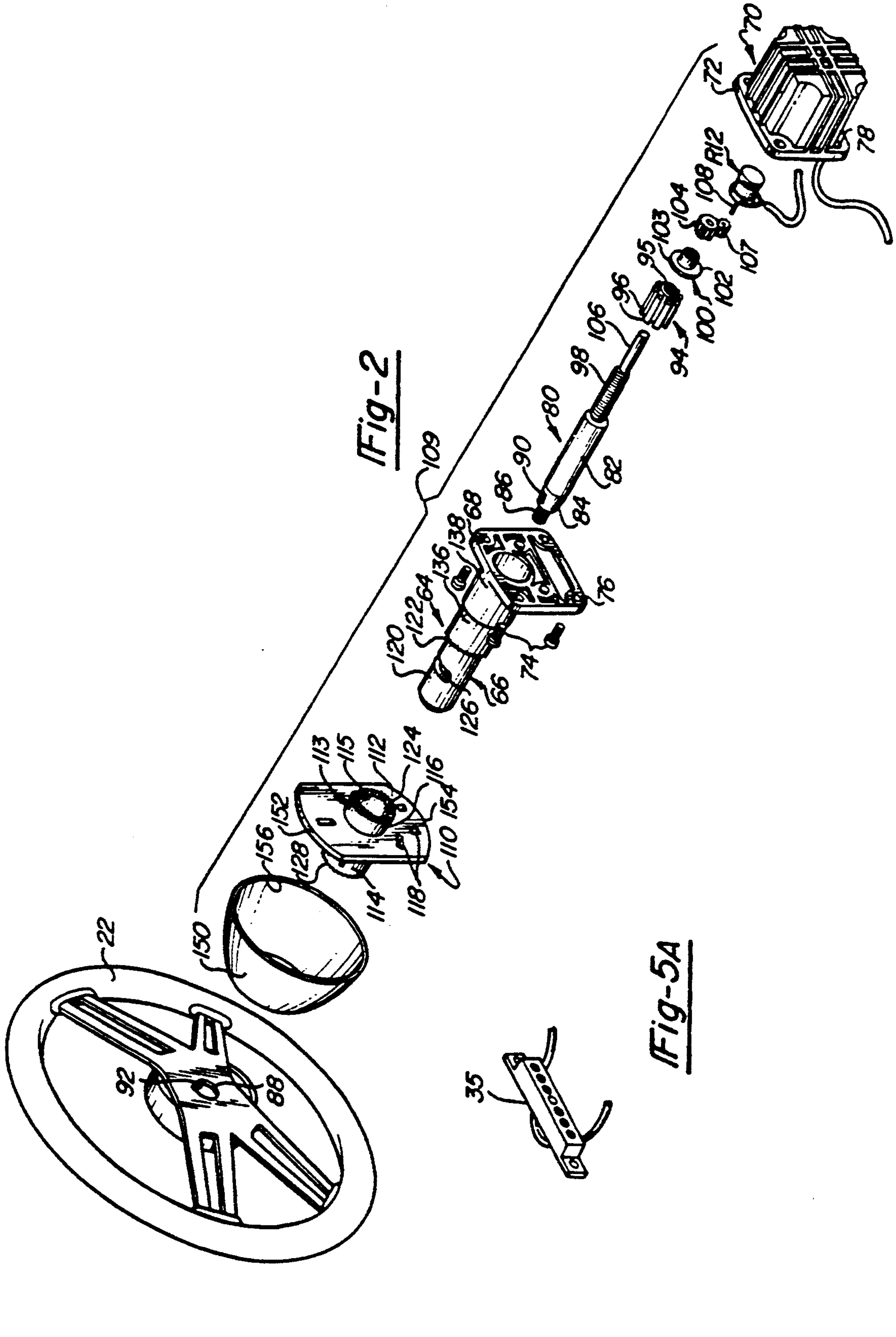
FIG. 2 is an exploded pictorial view of the mechanical and electrical components of the steering unit of the remote electrical steering system of the present invention of FIG. 1.
FIG. 5A is a pictorial view of the rudder position indicator of FIG. 5 for providing a visual indication to the vehicle operator of the steering orientation of the motor-rudder such as that of the boat of FIG. 1.
Figure 2A:
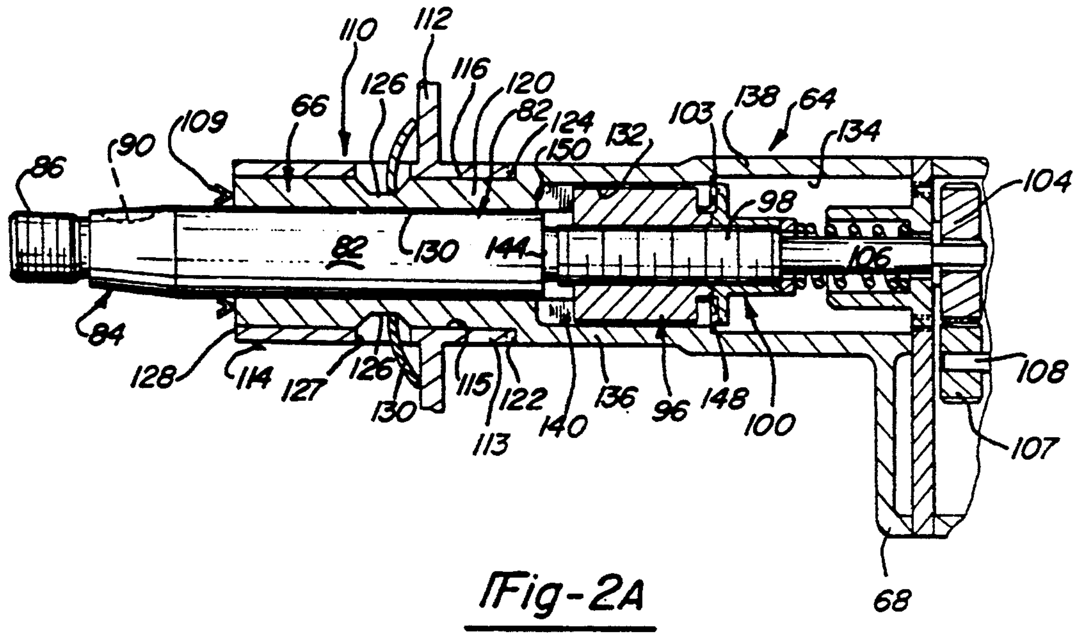
FIG. 2A is a longitudinal, plan view of components of FIG. 2 shown assembled with some parts shown in section and others partially shown.

Looking now to FIG. 2 an exploded pictorial view of one form of the steering unit 18 is shown. FIG. 2A shows components of the steering unit 18 in an assembled condition.

A steering shaft housing 64 is shown and includes a tubular shaft section 66 and a generally rectangular cover section 68. A steering unit housing 70 has a flange 72 at its open end which is adapted to engage a generally mating surface on the cover section 68 and to be secured thereto via threaded fasteners 74 which extend through clearance holes 76 in the cover section 68 and engage threaded openings 78 in the flange 72.

A steering shaft 80 is supported for rotation within shaft housing 64 and is secured to the steering wheel 22, in a manner to be described. Thus the steering shaft 80 has a body portion 82 which is generally uniform in diameter and which terminates at its forward end in a tapered portion 84 and a reduced diameter threaded retention portion 86. The steering wheel 22 has a tapered opening 88 adapted to matingly engage the tapered portion 86 on steering shaft 80. The wheel 22 can be held onto the tapered portion by means of a nut and washer (not shown) with the nut engaging the threaded retention portion 86 to urge the wheel opening 88 onto the tapered portion 84 in frictional engagement. Slots 90 and 92 in the tapered portion 84 and wheel opening 92 are adapted to be moved into radial alignment and to receive a key (not shown) whereby the wheel 22 and steering shaft 80 are held together from relative rotation.

A bushing 94 is provided to function as a stop member to limit the number of clockwise and counterclockwise turns of the steering wheel 22. In this regard the stop bushing 94 is externally, axially fluted or slotted to define axially extending rib segments 96. The stop bushing 94 has a central, threaded bore 95 adapted to be threadably received on a threaded, reduced diameter portion 98 adjacent the body portion 82 on steering shaft 80. A stop collar 100 is also adapted to be threaded onto the reduced diameter portion 98 and, as will be seen, is located at a preselected position to define one stop position and, once located, is fixed in that position. The stop collar 100 has a flange 102 at one end which is selectively deformable for adjusting the one stop position of the stop bushing 94.

The stop collar 100 can be crimped or otherwise deformed onto the rear threaded portion 98 to inhibit the stop collar 100 from rotation and to thereby fix the stop location. A final adjustment of the stop position can be achieved by deforming the radially outer portion 103 of flange 102 axially in a direction forwardly or towards the stop bushing 94 to thereby more precisely determine the distance of axial travel of the stop bushing 94 in the rearward direction (see FIG. 2A).

A drive gear 104 is fixed to a reduced diameter shaft portion 106 at the rearward end of the steering shaft 80. An output gear 107 is adapted to engage and be driven by the drive gear 104 and is fixed to the drive rod 108 of the steering sensor potentiometer R12. The gear ratio between gears 104 and 107 is selected such that substantially the full, resistance range of the potentiometer R12 is utilized, but not exceeded, as the steering wheel 22 is turned from the clockwise stop to the counterclockwise stop.

To set the position of the components of the steering unit 18 just described, the steering sensor potentiometer R12 is adjusted via drive rod 108 to its center position. The steering shaft 80 is assembled with its slot 90 in the radially upright position. This then assures that the steering wheel 22 will be located in its center or neutral position when assembled with its mating slot 92 located in the radially upright, centered position.

Prior to assembly of the steering wheel 22 onto the shaft 80, the components of subassembly 109 are assembled as a unit (see FIGS. 2 and 2A).

Once the position adjustment via the outer portion 103 of flange 102 has been made, the steering shaft 80 can be axially fixed to the shaft housing 64 via a retaining washer 109 which bitingly engages the body portion 82 of steering shaft 80 and resiliently engages the forward end of shaft section 66.

A dash bracket 110 is secured to the dash 111 (see FIG. 1) in the driver's compartment 20 of boat 10. The bracket 110 has a mounting plate 112 secured to a support tube 113 having forwardly and rearwardly extending ends 114 and 116, respectively. The plate 112 has a plurality of mounting slots 118 adapted to receive fasteners whereby the dash bracket 110 can be removably secured to the dash 111 with rearward end 116 of the support tube 113 extending through a suitable opening (not shown) in the dash 111. The support tube 113 has a central bore 115 adapted to slidably receive a reduced diameter portion 120 of the tubular shaft section 66 of shaft housing 64. The reduced diameter portion 120 terminates in a shoulder 122 which is serrated on its radial face. The end surface 124 of rearward tube end 116 is similarly serrated to provide mating, matching surfaces such that relative rotation is prevented when the serrated shoulders are engaged.

The reduced diameter portion 120 is provided with a pair of diametrically opposed circumferentially extending slots 126. The slots 126 are located at an axial position along reduced diameter portion 120 such that, when the setrations of end surface 124 and shoulder 122 are engaged, the slots 126 will be in line with slots 127 in tube end 114 of support tube 113. The slots 126 and 127 are adapted to receive a flexible spring washer 130 which is adapted to engage the mounting plate 112 whereby the assembly is held in place. The end surface 128 of tube end 114 is also serrated.

Looking now to FIG. 2A, the steering shaft housing 64 has a plurality of stepped bores 130, 132, and 134 which are located in reduced diameter end portion 120, an intermediate diameter portion 136 and a large diameter opposite end portion 138, respectively, of the tubular shaft section 66. The small bore 130 and large bore 134 are smooth while the intermediate bore 132 is provided with a plurality of radially and axially extending ribs 140. The ribs 140 are constructed to define grooves which matingly receive the rib segments 96 of stop bushing 94. Thus as the steering shaft 80 is rotated by turning the steering wheel 22, the stop bushing 94 is held from rotation by the engagement of the ribs 140 and rib segments 96 but will move axially within the intermediate bore 132.

A forward stop shoulder 144 is defined on steering shaft 80 at the juncture of body portion 82 and the reduced diameter threaded portion 98. At the same time, the rearward stop is defined by the position of the radially outer portion 103 of flange 102 of stop collar 100. Thus the stop shoulder 144 and flange portion 103 define the limits of axial travel of the stop bushing 94 and hence determine the number of clockwise and counterclockwise turns of the steering wheel 22. Note that the location of the stops 144 and 103 can be set before the steering shaft 80 is assembled to the shaft housing 64 thus simplifying the stop setting. In this regard, after the stops have been set, the steering shaft 80 with stop bushing 94 and stop collar 100 is assembled into the shaft housing 64 until the rearward stop 103 on flange 102 engages the shoulder 148 defined by the juncture between intermediate bore 132 and large bore 134. In this position the forward stop shoulder 144 is located within the intermediate bore 140 in clearance with a forward shoulder 150 defined by the juncture of the reduced diameter bore 130 and intermediate bore 132. Next the retaining washer 109 is placed on the body portion 82 as shown in FIG. 2A whereby the steering shaft 80, stop bushing 94 and stop collar 100 are secured to the shaft housing 64. This subassembly is then mounted to the dash bracket 110 via the retaining washer 130.

Next a decorative cap or bezel 150 is located on the dash bracket plate 112. In this regard the opposite ends 152, 154 of plate 112 are arcuately contoured to match the inside diameter of the large end 156 of bezel 150 such that the bezel 150 can be resiliently mounted onto the plate 112 with a slight interference fit. Next the steering wheel 22 is fitted over the tapered end portion 84 and slots 90 and 92 aligned and a key (not shown) inserted; a nut and washer (not shown) are then engaged over the threaded end portion 86 to secure the steering wheel 22 to the steering shaft 80 in proper alignment.

As assembled, the housing 70 and cover 68 are sealed by a gasket and/or other means (not shown) as is the steering shaft 80 relative to the shaft housing 64 to provide a sealed condition for the potentiometer R12 and other components. Note that the preceding steering assembly is a modification of prior mechanical, cable type steering units adapted for the electrical steering system of the present invention.

With this description of the steering unit 18 let us now look to the details of the power unit 23.

C. The Power Unit 23

Figure 3A:
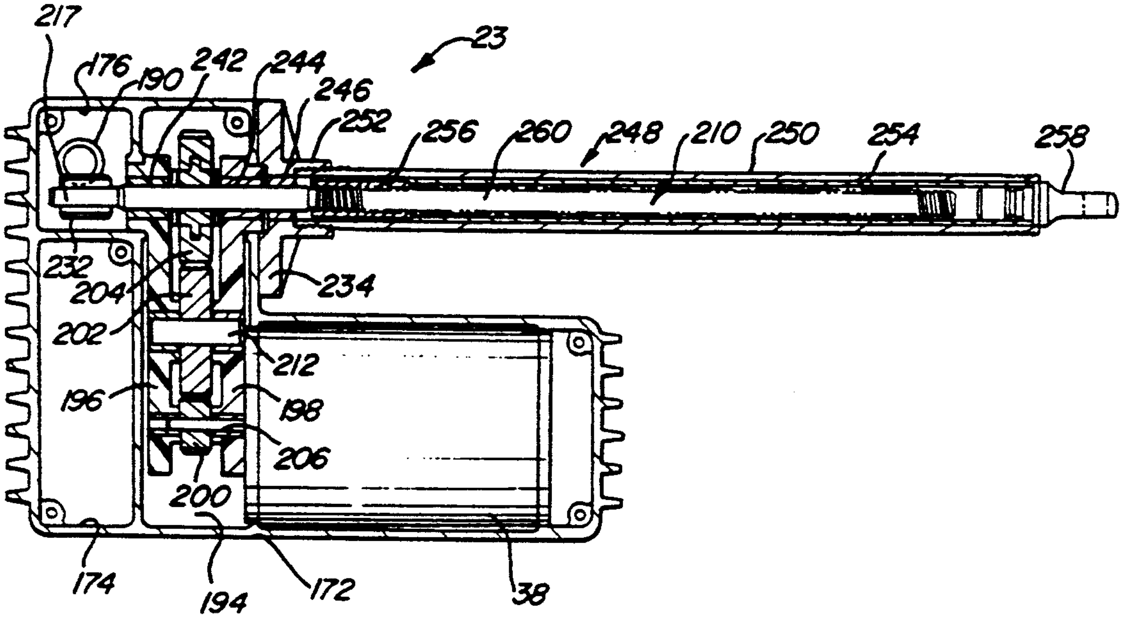
FIG. 3A is a longitudinal plan view of components of FIG. 3 shown assembled with some parts shown in section and others partially shown.
Figure 3:
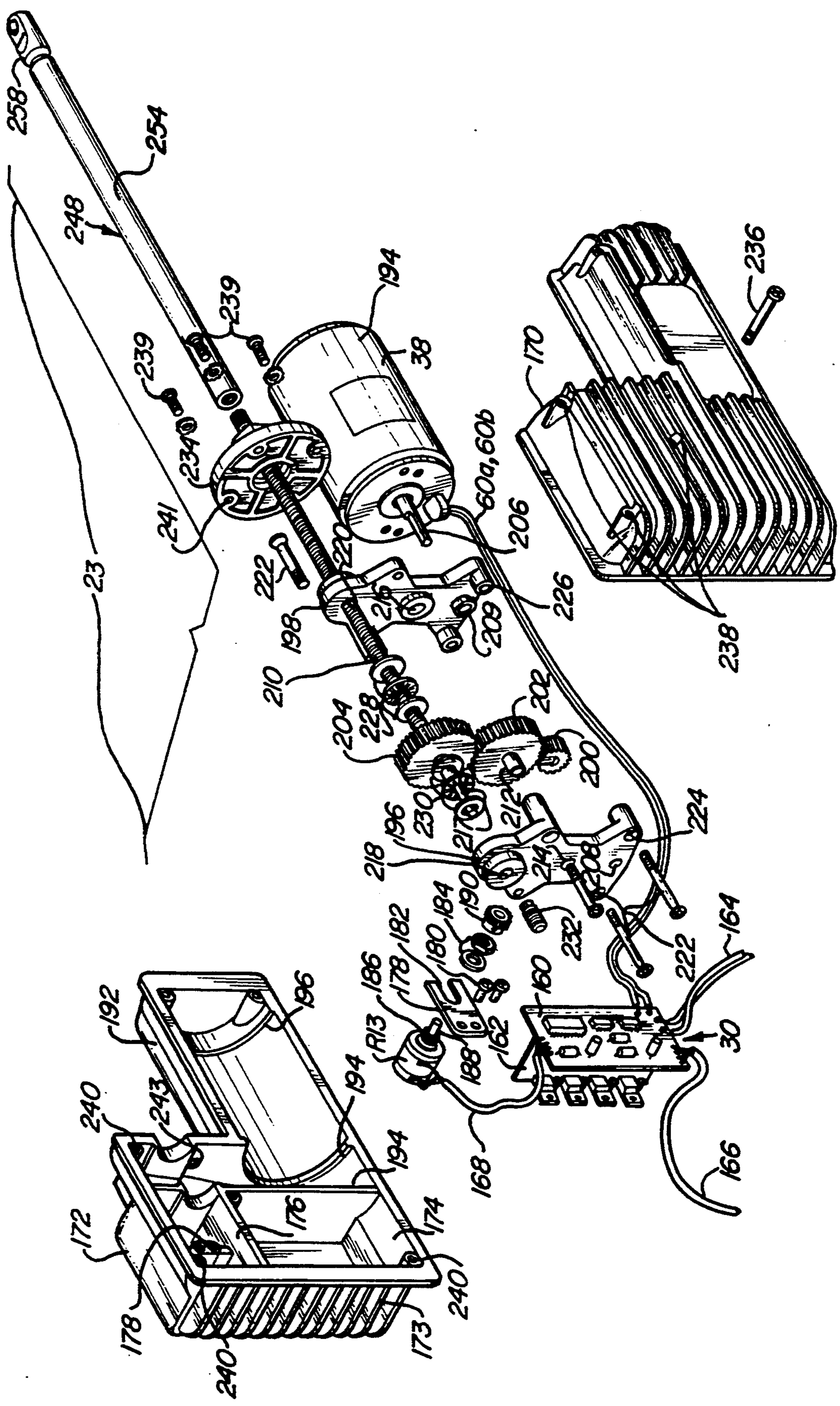
FIG. 3 is an exploded pictorial view of the mechanical and electrical components of the power unit of the remote electrical steering system of the present invention of FIG. 1.

The power unit 23 is shown in exploded view in FIG. 3 and in assembled view in FIG. 3A. The dc motor 38 has its rotor leads 60*a*, 60*b* connected to power unit circuit 30. The physical components are mounted onto front and center boards 160 and 162, respectively, connected in a T-shaped configuration. Lines 164 and 166 are generally shown and provide electrical connections from the steering potentiometer R12, rudder position indicator 32 and battery B to the power unit circuit 30. The motor-rudder potentiometer R13 is shown connected to the power unit circuit 30 via representative lines 168. A pair of similarly shaped housing members 170, 172 are generally L-shaped. Housing member 172 has a leg portion 173 with a generally rectangular opening 174 at one end adapted to receive the boards 160, 162 with a generally snug fit. A smaller opening 176 above the lower opening 176 is adapted to receive the motor-rudder potentiometer R13 via a bracket 178 which can be mounted to a post 178 via screws 180. The potentiometer R13 is secured to a slotted end 182 of the bracket 178 via a nut and washer assembly 184 adapted to engage a threaded boss 186 on potentiometer R13. The potentiometer R13 has a drive shaft 188 which is adapted to receive a driven gear 190. Art elongated body portion 192 extends from the housing leg portion 173 and is provided with a generally semi-circular contour to generally match the circular contour of the housing 194 of the dc motor 38. A pair of spaced shoulders 194, 196 restrain the dc motor 38 from axial movement. As can be seen in FIGS. 3 and 3A the outer surface of the housing members 170, 172 are ribbed to provide cooling for the internal electrical components.

The leg portion 173 has an elongated cavity 194 adapted to receive a pair of mounting and spacer brackets 196, 198. A gear train is shown and includes a drive gear 200, idler gear 202 and output gear 204. The gears 200, 202 and 204 are adapted to be rotatably supported between spacer brackets 196, 198 and supported thereon. Thus drive gear 200 is adapted to be located on the output, drive shaft 206 of dc motor 38, with the drive shaft 206 located via aligned openings 208, 209 in brackets 196, 198. Similarly, the idler gear 202 is supported in meshed engagement with drive gear 200 via a support pin or dowel 212 adapted to be supported in openings 214 and 216 in brackets 196 and 198, respectively. The output gear 204 is supported, in mesh with idler gear 202, upon the inner end of a drive screw 210 located in aligned openings 218 and 220 in brackets 196 and 198, respectively. The brackets 196 and 198 are held together in spaced relationship via fasteners 222 in mating openings 224 and 226, respectively. Thrust bearing and washer assemblies 228 and 230 are located on opposite axial sides of the output gear 204 to reduce axial, friction thrust loads between the output gear 204 and support brackets 196, 198.

The drive screw 210 has a plain inner end 217 which extends past mounting opening 218 in bracket 196 and receives a worm drive gear 232 which is adapted to be in driving engagement with drive gear 190 secured to drive shaft 188 on motor-rudder potentiometer R13.

A mounting flange 234 is adapted to be secured to the housing members 170 and 172 when the housing members 170 and 172 are secured together as by fasteners 236 through mating openings 238 and 240, respectively. The mounting flange 234 can be secured to the assembled housing members 170 and 172 via fasteners 239 via mating openings 241 and 243. Support bushings 242, 244, and 246 receive the inner end 217 of the drive screw 210 and are located in the support brackets 196 and 198 and mounting flange 234, respectively (see FIG. 3A). A drive tube assembly 248 includes the standard guide tube 250; guide tube 250 is externally threaded at its opposite ends with the mounting flange 234 having a boss 252 which is internally threaded to receive the one threaded end of the guide tube 250.

A steering tube 254 is slidably supported within the guide tube 250 and has a threaded drive nut member 256 secured at its inner end. A standard connector 258 is secured to the opposite outer end of the steering tube 254. Both the nut 256 and connector 258 can be secured to steering tube 254 by staking, crimping or the like. The connector 258 can be of a standard configuration similar to that used in cable assemblies where the cable is located in the standard guide tube (such as guide tube 250) and secured at its outer end to a connector (such as connector 258).

The drive screw 210 has an extended threaded section 260 which is adapted to be threaded into the nut 256. Thus as the drive screw 210 is rotated it is held in place axially but will cause the steering tube 254 to be moved axially, in translation. In a standard configuration, the connector 258 is pivotally connected to a pivot joint 272 on a pivot arm 262 which in turn is pivotally connected to a drive plate 264 on motor 14 (see FIG. 1). Thus as the steering tube 254 is moved in translation it will cause pivotal, steering movement of the motor-rudder 14 about axis X via pivot arm 262 and drive plate 264.

Thus in operation, when the operator turns the steering wheel 22, the steering wheel position potentiometer R12 will provide an unbalanced signal to the integrated circuit U2 of motor controller 34 resulting in a signal to the power circuit 36 rendering the appropriate pair of FETS Q3, Q4, Q5 and Q6 conductive whereby the dc motor 38 will be energized to rotate in the appropriate direction. This will result in the drive screw 210 being rotated in the proper direction via gears 200, 202 and 204 providing the appropriate translational movement of the steering tube 254 to appropriately pivot the motor 14 about its axis X. This action will be sensed by the motor-rudder potentiometer R13 via worm drive gear 232 and driven gear 190 and the appropriate signal fed to the integrated circuit U2 of motor controller 34. The action will continue until the sensed motor-rudder position sensed by potentiometer R13 provides the appropriate signal indicating the desired angular position of motor 14 relative to steering wheel 22 as sensed by steering wheel potentiometer R12. In this regard the gear ratio between gears 190 and 232 is selected such that substantially the full, resistance range of the potentiometer R13 is utilized, but not exceeded, as the motor 14 is pivoted from its maximum port to maximum starboard steering positions.

The power unit 23 will be secured to the guide tube 250 (see FIGS. 6B, 6C) and can be additionally fixed to the transom structure 16 via a suitable bracket or by other securing means.

In order that the system of the present invention provide versatility for use with a wide range of sizes and types of boats and motors, it was determined that the power unit 23 be capable of providing a maximum output thrust load at the steering tube 254 of around 200 pounds. At the same time the total linear travel of the steering tube 254 was determined to be between around 8.25 inches to around 9 inches. In order for the system to have a rapid response it was determined that in one form of the invention the steering tube 254 should be capable of its full travel, i.e. around 8.25 inches to around 9 inches for full port to full starboard turning, at a rate of around 2.5 inches per second or a total travel time of between around 3.3 seconds to around 3.6 seconds. Thus a travel rate of between a minimum of around 1.5 inches per second (5.5 seconds to 6 seconds total elapsed time) to a maximum of around 3.5 inches per second (2.35 seconds to 2.57 seconds total elapsed time) was desirable. A preferred elapsed time for total travel, i.e. full port to full starboard, was around 3 seconds. These objectives were accomplished by the appropriate dc motor 38 along with the proper gear ratio of the gear train defined by gears 200, 202 and 204 and the selection of the desired pitch of the drive screw 210 and drive nut member 256.

In a preferred form of the invention the gear ratio of gears 200, 202, 204 was selected to be around 2.4:1 with a range of around 6:1 to around 2:1; similarly a preferred thread pitch of drive screw 210 and drive nut member 256 was selected to be around 12 threads per inch with a range of around 6 threads per inch to around 12 threads per inch. In order to provide the desired response with the gear ratios and screw drive thread pitches noted the dc motor 38 was selected to be of the permanent magnet type and in a preferred form was of a one quarter horse power rating having an operating speed at full load, i.e. 200 pounds thrust load at steering tube 254, of around 3000 rpm with a range of from around 800 rpm to around 5500 rpm. In one form of the invention a dc motor manufactured by Specialty Motors was utilized.

Because of the high loads and power demands on the power unit 23, the housing members 170, 172 were, in one form of the invention, made of die cast aluminum and in a ribbed construction as shown. The use of aluminum, a good heat conductor, with the externally ribbed structure provides effective cooling to dissipate heat generated by the internal components.

To further improve the efficiency of the system for the high design loads, i.e. 200 pound thrust load, needle thrust bearings were selected for use in bearing assemblies 228 and 230. In addition self lubricating bearings were selected to rotatably support the gears 200, 202, and 204.

In order to reduce friction between the threads on drive screw 210 and the drive nut member 256 the threads on drive screw 210 were rolled to provide a smooth, engaged working surface. In addition the rolling also results in work hardening at the work surface of the threads which improves its strength and wear properties. In one form of the invention the drive screw 210 was made of high strength carbon steel.

Note that the use of a threaded drive via drive screw 210 and drive nut member 256 has the added benefit of providing a high resistance to reverse dynamic loads from the motor 14. Thus backlash from motor 14 and its attendant steering problems are substantially eliminated and shock loads from motor 14 to the internal components of the power unit 23, including the gears 200, 202, and 204 and gears 190 and 232, are also substantially eliminated.

As noted the power unit 23 is adapted to be used with a standard steering hookup including a standard guide tube 250. The parameters of the standard guide tube 250 as defined by the American Boating and Yacht Council is a tube of around eleven (11) inches minimum to around twelve (12) inches maximum in length, around 0.635±0.005 inches in internal diameter, and having an outside diameter of around 0.875 inches with its threaded end having a $\frac{7}{8}$–14 UNFS thread; the tube 250 can be made of aluminum or corrosion resistant steel.

Thus the system of the present invention provides a remote steering system having a high degree of versatility for boats and motors of various types and sizes and a desired rapid response rate and also provides a steering system which is adapted for use with standard steering components and is thus readily adaptable for use as a retrofit on existing boats with cable steering.

In this regard, the simplicity of such a retrofit is shown in FIGS. 6A, 6B and 6C. Looking now to FIG. 6A a prior art cable type steering system is shown. Here the motor 14 is secured to transom 16 via a mounting bracket and tilt assembly 270 with the pivot arm 262 connected to the pivot joint 272 on motor 14 for pivotal actuation of motor 14 about its axis X. The standard guide tube 250 is fixed to the mounting bracket assembly 270 via nut members 274 (only one shown) at opposite threaded ends of the guide tube 250. The connecting end section 276 of a prior art cable assembly for steering the motor 14 is shown pre-assembled relative to standard guide tube 250. Thus a drive cable 278 is supported from buckling in a support tube 280 which is slidably received within the bore of a hollow actuating rod 282 with the rod 282 swaged onto the inner end of the cable 278 and support tube 280 to mechanically hold these members together. Connector 284 is swage connected to the end of the rod 282 and (like connector 258 of FIGS. 3 and 3A) is adapted to provide a connection with the pivot arm 262. A nut 286 can be threadably connected to the associated threaded end of the standard guide tube 250 to thereby secure the end section 276 in place with connector 284 connected to pivot arm 262. Thus manipulation of the drive cable 278 by a remote steering wheel (not shown) causes reciprocation of the actuating rod 282 within the standard guide tube 250 whereby pivoting of the motor 14 about axis X is effected to steer the boat.

As shown in FIGS. 6B and 6C the retrofit from the prior art cable steering system to the present system is accomplished simply and quickly. Thus as shown in FIG. 6B, the power unit 23 is connected to the motor 14 via the mounting flange 234 which is adapted to be threadably received upon the associated threaded end of the standard guide tube 250 extending past the nut 274. Of course, the flange 234 is in turn connected to the drive housing defined by housing members 170, 172. In this regard, the flange 234 is first threaded onto the guide tube 250 and then is assembled to the housing (170, 172) via fasteners 236. Now the steering tube 254 will be slidably supported in the standard guide tube 250 with connector 258 connected to pivot arm 262 to provide the final assembly shown in FIG. 6C. Thus, as can be seen, the retrofit of an existing cable system can be quickly made by virtue of the compatibility of the present system with the standard guide tube 250.

While it will be apparent that the preferred embodiments of the invention disclosed are well calculated to fulfill the objects above stated, it will be appreciated that the invention is susceptible to modification, variation and change without departing from the proper scope or fair meaning of the invention; by way of example but not limitation, it should be understood that the word combination "motor-rudder" can refer to steering by pivoting a motor and/or steering by pivoting a separate rudder; along the same lines, reference to a steering unit can be a steering wheel, joy stick or other manually operated or actuated device to provide a selected directional steering signal.

What is claimed is:

1. A remote, electrical steering system for marine vehicles having a motor-rudder mounted for pivotal steering movement about a pivot axis, said system comprising:

motor-rudder position sensing means for providing a motor-rudder signal indicative of the angular position of the motor-rudder relative to a neutral motor-rudder angular position about the pivot axis, steering unit means remote from the motor-rudder and actuable by an operator to selected positions relative to a neutral steering angular position related to desired angular steering positions of the motor-rudder about the pivot axis, steering position sensing means operatively connected with said steering unit means for providing a steering position signal indicative of the position of said steering unit means relative to said neutral steering angular position, first circuit means responsive to said motor-rudder signal and said steering position signal for providing a control signal indicative of preselected differences between said motor-rudder angular position and said selected positions of said steering unit means, electric motor drive means operatively connected to the motor-rudder and responsive to an electrical drive signal to pivot the motor-rudder to determinable angular positions about the pivot axis, power circuit means operatively connected with said first circuit means and to said electric motor drive means and responsive to said control signal for providing said drive signal to said electric motor drive means, said electric motor drive means comprising a direct current motor having a rotor winding having two ends each adapted to be alternately connected to opposite polarities for driving said direct current motor in opposite directions, said power circuit means providing drive current to said rotor winding in response to said drive signal, condition sensing means for sensing a preselected fault condition and for providing a brake signal, said power circuit means in response to said brake signal generally connecting said ends of said rotor winding together to brake said electric motor drive means in response to the fault condition and to inhibit involuntary steering movement of the motor.

2. In a remote, electrical steering system for marine vehicles having a motor-rudder mounted for pivotal steering movement about a pivot axis and with the motor rudder secured at the rear or aft end of the marine vehicle by a mounting bracket and including a hollow guide tube of a standard construction for use in a cable steering system with said guide tube being a hollow construction having a length of between around eleven inches to around twelve inches and with said guide tube adapted to be fixed to said mounting bracket and with said guide tube having a connecting portion adapted for connection with a cable assembly of the cable steering system with the cable operable through said guide tube, the improvement comprising:

motor-rudder position sensing means for providing a motor-rudder signal indicative of the angular position of the motor-rudder relative to a neutral motor-rudder angular position about the pivot axis, steering unit means remote from the motor-rudder and actuable by an operator to selected positions relative to a neutral steering angular position related to desired angular steering positions of the motor-rudder about the pivot axis, steering position sensing means operatively connected with said steering unit means for providing a steering position signal indicative of the position of said steering unit means relative to said neutral steering angular position, first circuit means responsive to said motor-rudder signal and said steering position signal for providing a control signal indicative of preselected differences between said motor-rudder angular position and said selected positions of said steering unit means, electric motor drive means operatively connected to the motor-rudder and responsive to an electrical drive signal to pivot the motor-rudder to determinable angular positions about the pivot axis, power circuit means operatively connected with said first circuit means and to said electric motor drive means and responsive to said control signal for providing said drive signal to said electric motor drive means, said electric motor drive means comprising an electric motor, support means for supporting said electric motor, actuating means operatively associated with said electric motor and the motor-rudder for moving the motor-rudder to said desired angular steering positions about the pivot axis, said actuating means comprising said hollow guide tube whereby said electrical steering system can be used alternatively with a cable steering system employing said guide tube, said actuating means further comprising mounting means adapted to connect said guide tube to said support means at said connecting portion of said guide tube, a steering tube slidably supported in said guide tube for reciprocating movement therein and drive connecting means for connecting said steering tube to said electric motor whereby said steering tube can be actuated for powered reciprocating movement in said guide tube and motor-rudder connecting means for connecting said steering tube to the motor-rudder for pivotally steering the motor-rudder about its pivot axis in response to the powered reciprocating movement of said steering tube within said guide tube.

3. In a remote, electrical steering system for marine vehicles having a motor-rudder mounted for pivotal steering movement about a pivot axis and with the motor rudder secured at the rear or aft end of the marine vehicle by a mounting bracket and includes a hollow guide tube of a standard construction for use in a cable steering system with said guide tube being a hollow construction having a length of between around eleven inches to around twelve inches and with said guide tube adapted to be fixed to said mounting bracket and with said guide tube having a connecting portion adapted for connection with a cable assembly of the cable steering system with a cable operable through said guide tube, the improvement comprising:

motor-rubber position sensing means for providing a motor-rudder signal indicative of the angular position of the motor-rudder relative to a neutral motor-rudder angular position about the pivot axis, steering unit means remote from the motor-rudder and actuable by an operator to selected positions relative to a neutral steering angular position related to desired angular steering positions of the motor-rudder about the pivot axis, steering position sensing means operatively connected with said steering unit means for providing a steering position signal indicative of the position of said steering unit means relative to said neutral steering angular position, first circuit means responsive to said motor-rudder signal and said steering position signal for providing a control signal indicative of preselected differences between said motor-rudder angular position and said selected positions of said steering unit means.

electric motor drive means operatively connected to the motor-rudder and responsive to an electrical drive signal to pivot the motor-rudder to determinable angular positions about the pivot axis, power circuit means operatively connected with said first circuit means and to said electric motor drive means and responsive to said control signal for providing said drive signal to said electric motor drive means, said electric motor drive means comprising an electric motor, support means for supporting said electric motor, actuating means operatively associated with said electric motor and the motor-rudder for moving the motor-rudder to said desired angular steering positions about the pivot axis, gear means for drivingly connecting said electric motor to said actuating means, said actuating means comprising said hollow guide tube, a steering tube slidably supported for translational movement within said hollow guide tube, said actuating means further comprising mounting means adapted to connect said guide tube to said support means at said connecting portion of said guide tube, said steering tube having a threaded nut structure at one end, said actuating means further comprising a drive screw threadably engageable with said nut structure of said steering tube and adapted to be rotated by said electric motor through said gear means, drive connecting means for connecting said steering tube to said electric motor whereby said steering tube can be actuated for powered translation movement in said guide tube, and motor-rudder connecting means for connecting said steering tube to the motor-rudder for moving the motor-rudder to said desired angular steering positions in response to the powered translation movement of said steering tube within said guide tube.

4. The system of claim 1 with said preselected fault condition sensed by said condition sensing means being a preselected failure in said steering position sensing means.

5. The system of claim 1 with said preselected fault condition sensed by said condition sensing means being a preselected failure in said motor-rudder position sensing means.

6. The system of claim 1 with said preselected fault condition sensed by said condition sensing means including preselected failures in said steering position sensing means and said motor-rudder position sensing means.

7. The system of claim 3 with said electric motor drive means including a permanent magnet direct current motor providing around 200 pounds of thrust load to said steering tube of full load.

8. The system of claim 7 with said direct current motor having an operating speed range of from between around 800 rpm to around 5500 rpm and an operating speed at full load of around 3000 rpm.

9. The system of claim 3 with said electric motor drive means providing a total linear travel of said steering tube of between around 8.25 inches to around 9 inches.

10. The system of claim 3 with said electric motor drive means providing a total linear travel of said steering tube of between around 8.25 inches to around 9 inches, said electric motor drive means providing said total linear travel at a rate of around 1.5 inches per second to around 3.5 inches per second.

11. The system of claim 3 with said electric motor drive means providing a total linear travel of said steering tube of between around 8.25 inches to around 9 inches, said electric motor drive means providing said total linear travel in between around 2.35 seconds to around 3.6 seconds.

12. In a remote, electrical steering system for marine vehicles having a motor-rudder mounted for pivotal steering movement about a pivot axis and with the motor rudder secured at the rear or aft end of the marine vehicle by a mounting bracket and including a hollow guide tube of a standard construction for use in a cable steering system with said guide tube being a hollow construction having a length of between around eleven inches to around twelve inches and with said guide tube adapted to be fixed to said mounting bracket and with said guide tube having a connecting portion adapted for connection with a cable assembly of the cable steering system with a cable operable through said guide tube, the improvement comprising:

motor-rudder position sensing means for providing a motor-rudder signal indicative of the angular position of the motor-rudder relative to a neutral motor-rudder angular position about the pivot axis, steering unit means remote from the motor-rudder and actuable by an operator to selected positions relative to a neutral steering angular position related to desired angular steering positions of the motor-rudder about the pivot axis, steering position sensing means operatively connected with said steering unit means for providing a steering position signal indicative of the position of said steering unit means relative to said neutral steering angular position, first circuit means responsive to said motor-rudder signal and said steering position signal for providing a control signal indicative of preselected differences between said motor-rudder angular position and said selected positions of said steering unit means, electric motor drive means operatively connected to the motor-rudder and responsive to an electrical drive signal to pivot the motor-rudder to determinable angular positions about the pivot axis, power circuit means operatively connected with said first circuit means and to said electric motor drive means and responsive to said control signal for providing said drive signal to said electric motor drive means, said electric motor drive means comprising an electric motor, actuating means operatively associated with said electric motor and the motor-rudder for moving the motor-rudder to said desired angular steering positions about the pivot axis, said actuating means comprising said hollow guide tube whereby said electrical steering system can be used alternatively with a cable steering system employing said guide tube, gear means for drivingly connecting said electric motor to said actuating means, said actuating means comprising said hollow guide tube, a steering tube slidably supported for translational movement within said hollow guide tube, said steering tube having a threaded nut structure at one end, said actuating means further comprising a drive screw threadably engageably with said nut structure of said steering tube and adapted to be rotated by said electric motor through said gear means, drive connecting means for connecting said steering tube to said gear means whereby said steering tube can be actuated for powered translational movement in said guide tube, and motor-rudder connecting means for connecting said steering tube to the motor-rudder for moving the motor-rudder to said desired angular steering positions in response to the powered translational movement of said steering tube within said guide tube.

13. In a remote, electrical steering system for marine vehicles having a motor-rudder mounted for pivotal steering movement about a pivot axis and with the motor rudder secured at the rear or aft end of the marine vehicle by a mounting bracket and including a hollow guide tube of a standard construction for use in a cable steering system with said guide tube being a hollow construction having a length of between around eleven inches to around twelve inches and with said guide tube adapted to be fixed to said mounting bracket and with said guide tube having a connecting portion adapted for connection with a cable assembly of the cable steering system with a cable operable through said guide tube, the improvement comprising:

motor-rudder position sensing means for providing a motor-rudder signal indicative of the angular position of the motor-rudder relative to a neutral motor-rudder angular position about the pivot axis, steering unit means remote from the motor-rudder and actuable by an operator to selected positions relative to a neutral steering angular position related to desired angular steering positions of the motor-rudder about the pivot axis, steering position sensing means operatively connected with said steering unit means for providing a steering position signal indicative of the position of said steering unit means relative to said neutral steering angular position, first circuit means responsive to said motor-rudder signal and said steering position signal for providing a control signal indicative of preselected differences between said motor-rudder angular position and said selected positions of said steering unit means, electric motor drive means operatively connected to the motor-rudder and responsive to an electrical drive signal to pivot and the motor-rudder to determinable angular positions about the pivot axis, power circuit means operatively connected with said first circuit means and to said electric motor drive means and responsive to said control signal for providing said drive signal to said electric motor drive means, condition sensing means for sensing a preselected fault condition and for providing a signal to prevent generation of said drive signal in response to the fault condition, brake means operative for resisting involuntary steering movement of the motor-rudder in the absence of said drive signal, said electric motor drive means comprising an electric motor, support means for supporting said electric motor, actuating means operatively associated with said electric motor and the motor-rudder for moving the motor-rudder to said desired angular steering positions about the pivot axis, said actuating means comprising said hollow guide tube whereby said electrical steering system can be used alternatively with a cable steering system employing said guide tube, said actuating means further comprising mounting means adopted to connect said guide tube to said support means at said connecting portion of said guide tube, a steering tube slidably supported in said guide tube for reciprocating movement therein and drive connecting means for connecting said steering tube to said electric motor whereby said steering tube can be actuated for powered reciprocating movement in said guide tube and motor-rudder connecting means for connecting said steering tube to the motor-rudder for pivotally steering the motor-rudder about its pivot axis in response to the powered reciprocating movement of said steering tube, said electric motor being a direct current, permanent magnet motor having a rotor winding with two ends each adapted to be alternatively connected to opposite polarities for driving said direct current motor in opposite directions, said brake means comprising condition sensing means for sensing a preselected fault condition and for providing a brake signal, said power circuit means in response to said brake signal generally connecting said ends of said rotor winding together to brake said electric motor drive means in response to the fault condition whereby involuntary steering movement of the motor-rudder is inhibited.

14. The system of claim 13 with said preselected fault condition sensed by said condition sensing means including preselected failures in said steering position sensing means and said motor-rudder position sensing means.

15. The system of claim 13 with said preselected fault condition sensed by said condition sensing means including preselected failures in said steering position sensing means and said motor-rudder position sensing means.

16. The system of claim 12 with said electric motor drive means including a permanent magnet direct current motor providing around 200 pounds of thrust load to said steering tube at full load, said direct current motor having an operating speed range of from between around 800 rpm to around 5500 rpm and an operating speed at full load of around 3000 rpm.

said electric motor drive means providing a total linear travel of said steering tube of between around 8.25 inches to around 9 inches.

said electric motor drive means providing said total linear travel at a rate of around 1.5 inches per second to around 3.5 inches per second, said electric motor drive means providing said total linear travel in between around 2.35 second to around 3.6 seconds.

17. A remote, electrical steering system for marine vehicles having a motor-rudder mounted for pivotal steering movement about a pivot axis, said system comprising: motor-rudder position sensing means for providing a motor-rudder signal indicative of the angular position of the motor-rudder relative to a neutral motor-rudder angular position about the pivot axis, steering unit means remote from the motor-rudder and actuable by an operator to selected positions relative to a neutral steering angular position related to desired angular steering positions of the motor-rudder about the pivot axis, steering position sensing means operatively connected with said steering unit means for providing a steering position signal indicative of the position of said steering unit means relative to said neutral steering angular position, first circuit means responsive to said motor-rudder signal and said steering position signal for providing a control signal indicative of preselected differences between said motor-rudder angular position and said selected positions of said steering unit means, electric motor drive means operatively connected to the motor-rudder and responsive to an electrical drive signal to pivot the motor-rudder to determinable angular positions about the pivot axis, power circuit means operatively connected with said first circuit means and to said electric motor drive means and responsive to said control signal for providing said drive signal to said electric motor drive means, said electric motor drive means comprising a direct current motor having a rotor winding having two ends each adapted to be alternatively connected to opposite polarities for driving said direct current motor in opposite directions, said power circuit means providing drive current to said rotor winding in response to said drive signal, condition sensing means for sensing a preselected fault condition and for providing an inhibit signal in response to the fault condition, said power circuit means in response to said inhibit signal being operative with said rotor winding to disable said electric motor drive means in response to the fault condition whereby involuntary steering movement of the motor-rudder by said electric motor drive means is inhibited.

18. In a remote, electrical steering system for marine vehicles having a motor-rudder mounted for pivotal steering movement about a pivot axis and the with the motor rudder secured at the rear or aft end of the marine vehicle by a mounting bracket, the improvement comprising:

motor-rudder position sensing means for providing a motor-rudder signal indicative of the angular position of the motor-rudder relative to a neutral motor-rudder angular position about the pivot axis, steering unit means remote from the motor-rudder and actuable by an operator to selected positions relative to a neutral steering angular position related to desired angular steering positions of the motor-rudder about the pivot axis, steering position sensing means operatively connected with said steering unit means for providing a steering position signal indicative of the position of said steering unit means relative to said neutral steering angular position, first circuit means responsive to said motor-rudder signal and said steering position signal for providing a control signal indicative of preselected differences between said motor-rudder angular position and said selected positions of said steering unit means, electric motor drive means operatively connected to the motor-rudder and responsive to an electrical drive signal to pivot the motor-rudder to determinable angular positions about the pivot axis, power circuit means operatively connected with said first circuit means and to said electric motor drive means and responsive to said control signal for providing said drive signal to said electric motor drive means, said electric motor drive means comprising an electric motor, support means for supporting said electric motor, actuating means operatively associated with said electric motor and the motor-rudder for moving the motor-rudder to said desired angular steering positions about the pivot axis, gear means for drivingly connecting said electric motor to said actuating means, said actuating means comprising a hollow guide tube, said guide tube adapted to be fixed to said mounting bracket and having a connecting portion, a steering tube slidably supported for translational movement within said hollow guide tube, said actuating means further comprising mounting means adapted to connect said guide tube to said support means at said connecting portion of said guide tube, said steering tube having a threaded nut structure at one end, said actuating means further comprising a drive screw threadably engageable with said nut structure of said steering tube and adapted to be rotated by said electric motor through said gear means, drive connecting means for connecting said steering tube to said electric motor whereby said steering tube can be actuated for powered translation movement in said guide tube, and motor-rudder connecting means for connecting said steering tube to the motor-rudder for moving the motor-rudder to said desired angular steering positions in response to the powered translational movement of said steering tube within said guide tube, said support means including a housing with said mounting means connecting said housing to said connecting portion, said first circuit means and said power circuit means being supported in said housing proximate to said electric motor.

19. The system of claim 18 with said gear means supported in said housing.

20. The system of claim 18 with said motor-rudder position sensing means supported in said housing.

21. The system of claim 18 with said gear means and said motor-rudder position sensing means supported in said housing.

* * * * *

UNITED STATES PATENT AND TRADEMARK OFFICE

CERTIFICATE OF CORRECTION

PATENT NO. : 5,361,024

DATED : November 1, 1994

INVENTOR(S) : Gary E. Wisner et al

It is certified that error appears in the above-indentified patent and that said Letters Patent is hereby corrected as shown below:

Col. 6, line 8, delete "$3, $4, $5, and $6" and substitute therefor --S3, S4, S5 and S6--.
Col. 6, line 52, delete "0.-8" and substitute therefor --0-8--.
Col. 6, line 62, before "is" insert --9--.
Col. 7, line 10, delete "VgS" and substitute therefor --Vg5--.
Col. 8, line 22, delete "MS" and substitute therefor --M5--.
Col. 8, line 24, delete "MS" and substitute therefor --M5--.
Col. 8, line 35, delete "QS" and substitute therefor --Q5--.
Col. 8, line 39, delete "QS" and substitute therefor --Q5--.
Col. 8, line 49, delete "QS" and substitute therefor --Q5--.
Col. 8, line 53, delete "QS" and substitute therefor --Q5--.
Col. 11, line 62, delete "setrations" and substitute therefor --serrations--.
Col. 13, line 21, delete "Art" and substitute therefor --An--.
Col. 17, line 52, Claim 1, after "motor" insert ---rudder--".
Col. 18, line 57, Claim 3, delete "includes" and substitute therefor --including--.
Col. 18, line 67, Claim 3, delete "rubber" and substitute therefor --rudder--.
Col. 20, line 6, Claim 7, delete "of" and substitute therefor --at--.
Col. 21, line 20, Claim 12, delete "engageably" and substitute therefor --engageable--.
Col. 22, line 1, Claim 13, delete "and".
Col. 23, line 5, Claim 16, delete "." and substitute therefor --,--.
Col. 23, line 10, Claim 16, delete "second" and substitute therefor --seconds--.
Col. 23, line 61, Claim 18, delete "the" first occurrence.

Signed and Sealed this

Twenty-first Day of February, 1995

*Attest:*

Bruce Lehman

BRUCE LEHMAN

*Attesting Officer*

*Commissioner of Patents and Trademarks*